Patented Nov. 11, 1924.

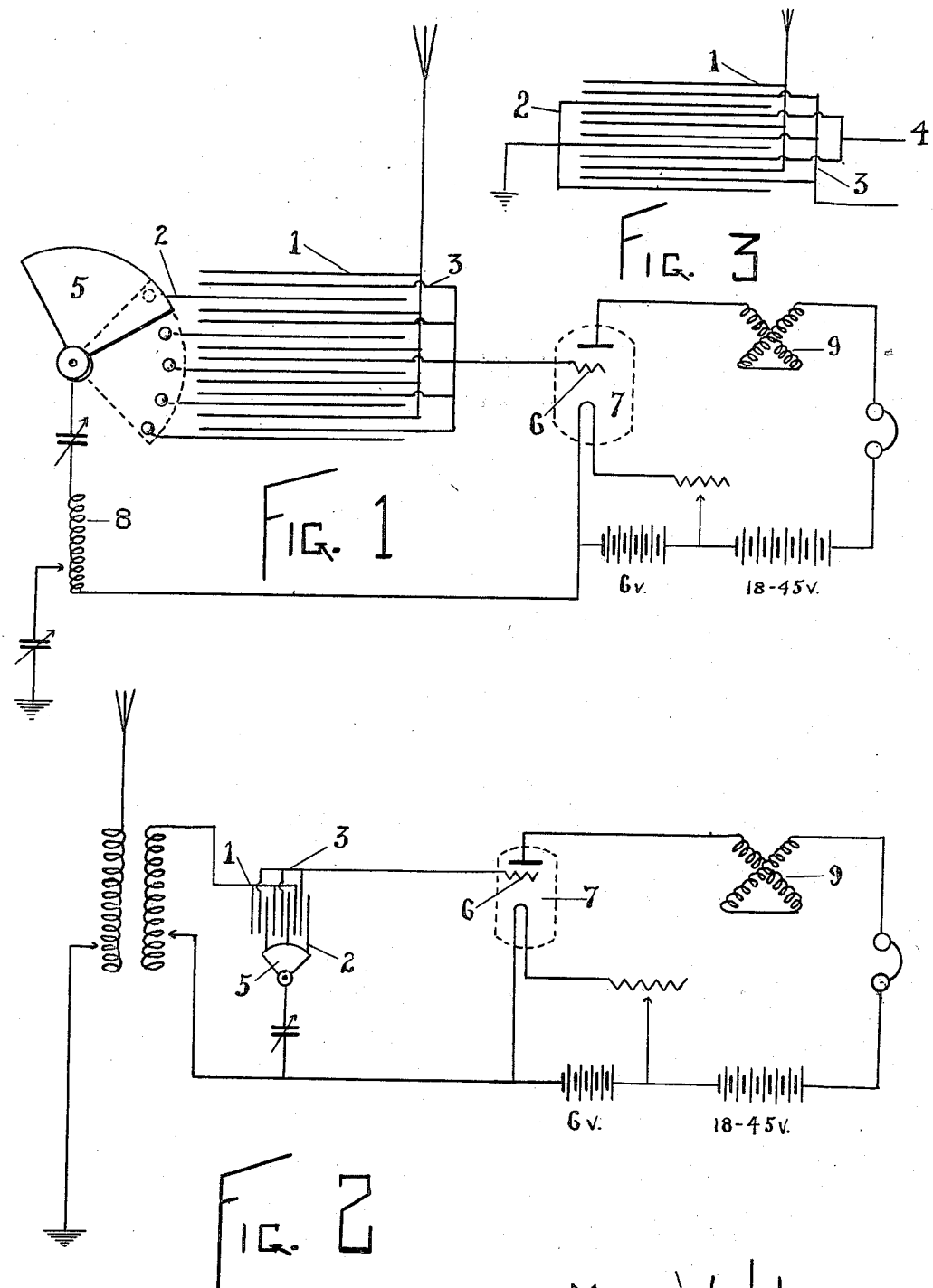

1,514,661

UNITED STATES PATENT OFFICE.

MAX W. HAUB, OF ALHAMBRA, CALIFORNIA.

RADIO RECEIVING AND TRANSMITTING SYSTEM.

Application filed November 6, 1922. Serial No. 599,407.

*To all whom it may concern:*

Be it known that I, MAX W. HAUB, a citizen of the United States, and a resident of the city of Alhambra, county of Los Angeles, and State of California, have invented a novel and useful Improvement in Radio Receiving and Transmitting Systems, of which the following is a specification.

My invention pertains to radio telegraphic and telephonic transmission and receiving systems, and has for an object to provide a condenser of adjustable capacity adapted to generate an induced current of special value in energizing the grid of an ordinary audion detector bulb.

A further object is to provide a condenser adapted to serve as an effective filter to eliminate static and other undesirable interferences.

Still another object is to provide a condenser, which, in combination with the various elements of the well known triode receiving system, will serve as an amplifier, resulting in greatly increased audibility.

I attain these objects by the provision, formation and combination of members and parts as shown in the accompanying drawings, in which—

Figure 1 illustrates a receiving system embodying my improved condenser, the same shown in enlarged detail.

Figure 2 illustrates a receiving system of a different type, embodying my improved condenser.

Figure 3 illustrates my improved condenser in detail, comprising four plate members.

In the accompanying drawings I have confined my diagrams to the illustration of my invention as applied to radio receiving systems. But it is equally valuable as an integral part of transmission systems as well, and it will be apparent that it may be effectively used in greatly varied specific relationships within either of such systems.

Referring more particularly to the drawings:—

My improved condenser comprises two dielectrically opposed plate members as in the ordinary fixed condenser now in common use, namely, plate 1 on the aerial side and plate 2 on the ground side of a receiving circuit; and a third plate member 3 between and in dielectric relation to plates 1 and 2, thus forming a three member condenser group. By this construction the incoming energy sets up an induced current in member 3, synchronous in oscillations with the energy received but with special valuable characteristics making for greater efficiency in the complete system. This induced current from plate 3 I make use of to agitate the grid 6 of detector bulb 7.

By multiplying indefinitely this three plate member group I produce a three member multiple plate condenser; and for added efficiency and because experimentation demonstrates that varying degrees of condenser capacity are desirable for varying wave lengths and varying degrees of incoming energy, I have made my novel condenser adjustable by means of a rotatable sector terminal, 5, for plate 2 and multiples thereof. By this sector terminal one group of three plate members or any number of said groups may be thrown into circuit.

In like manner a fourth member 4 may be introduced in similar dielectric relation to members 1 and 2 if desired, as illustrated in Figure 3.

Without attempting to theoretically explain the action of my condenser in radio receiving sets, experimentation shows results of striking character and utility easily demonstrated by one skilled in the art. A summary of those results would include among others:

Its function as a filter in eliminating undesirable wave lengths and static impulses greatly facilitates tuning;

Agitation of the grid 6 by the induced high potential current from member 3 allows a much greater facility of electronic flow within bulb 7, while at the same time fortifying the energy which controls the said electronic flow, through adjustment by coil 8.

The addition of this improved condenser in the receiving systems illustrated in Figures 1 and 2, with a one stage amplifier of the ordinary type is equivalent in audibility to an ordinary regenerative set with two stage audio-frequency amplification.

Having thus disclosed my invention I claim as new and desire to obtain Letters Patent of the United States upon—

1. In a radio telegraphic and telephonic transmitting and receiving system, in combination, a condenser mechanically and electrically connected in the aerial-to-ground circuit, comprising two fixed dielectrically opposed plate members and a third or induction plate member between said two fixed plate members and dielectrically related thereto; said third plate member mechanically and electrically connected by a lead therefrom to the grid of an audion bulb of said system.

2. In a radio telegraphic and telephonic transmitting and receiving system, in combination, a condenser mechanically and electrically connected in the aerial-to-ground circuit, comprising multiple groups of three condenser plate members; each of said groups comprising two fixed plate members dielectrically related, and a third or induction plate member between said two fixed plate members and dielectrically related thereto; the corresponding plate members of each of said groups mechanically and electrically connected; a lead from said third plate member of each of said groups to the grid of an audion bulb of said system; and means of varying the capacity of said condenser by increasing or decreasing the number of said groups admitted into said aerial-to-ground circuit, all substantially as set forth.

In testimony whereof, I have signed my name to this application and power of attorney in the presence of two subscribing witnesses.

MAX W. HAUB.

Witnesses:
C. J. RUBLAND,
LESLIE L. BROWN.